May 31, 1932.  W. B. HUTHER  1,861,218
CIRCULAR SAW
Filed Dec. 20, 1930
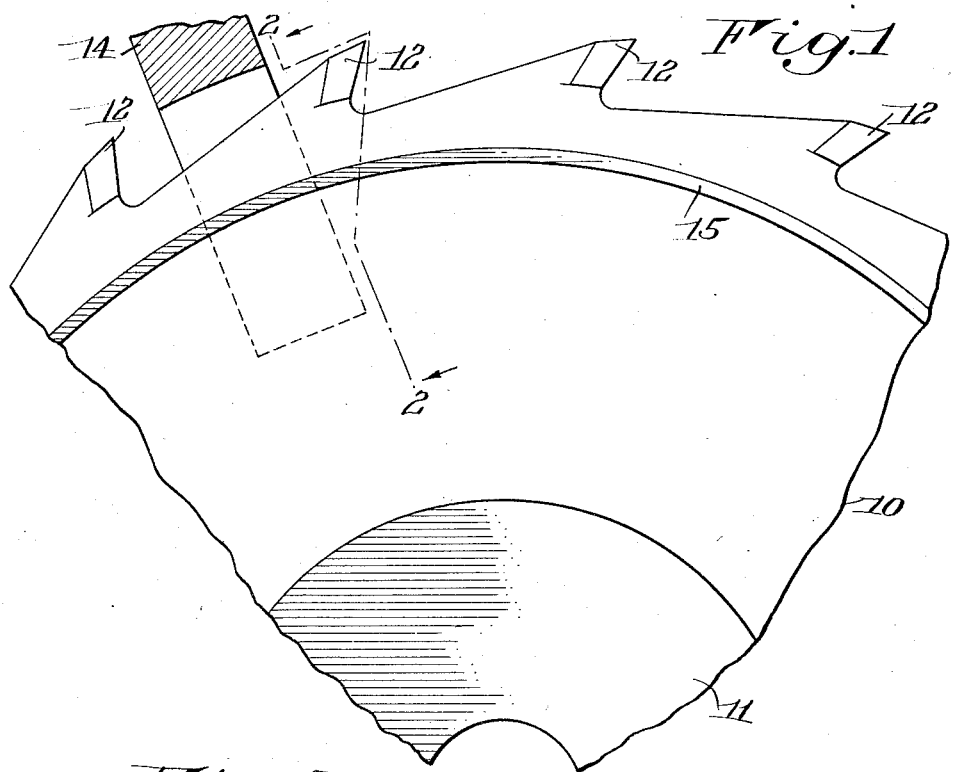
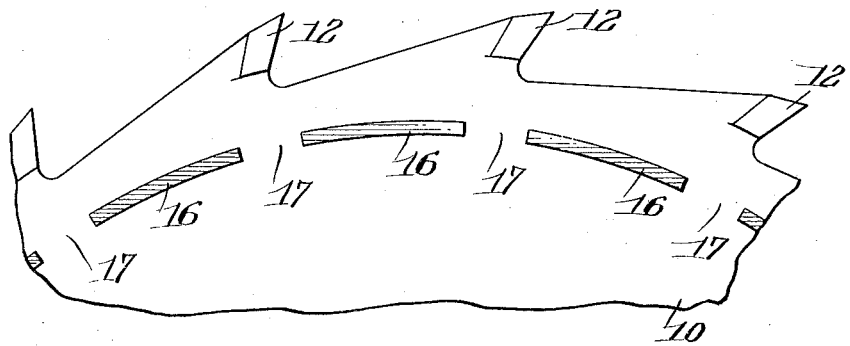
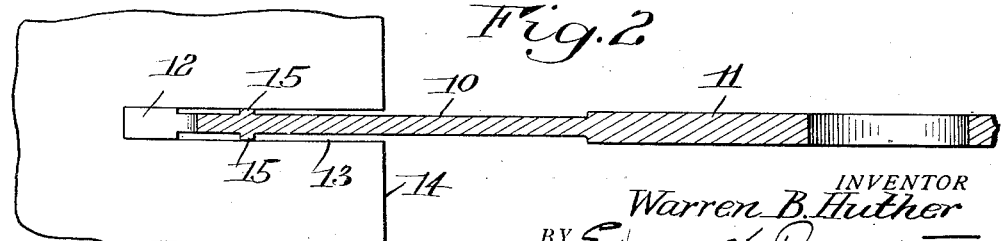
INVENTOR
Warren B. Huther
BY Edward H. Cumpston
his ATTORNEY Patented May 31, 1932

1,861,218

UNITED STATES PATENT OFFICE

WARREN B. HUTHER, OF ROCHESTER, NEW YORK, ASSIGNOR TO HUTHER BROTHERS SAW MANUFACTURING COMPANY, OF ROCHESTER, NEW YORK, A CORPORATION OF NEW YORK

CIRCULAR SAW

Application filed December 20, 1930. Serial No. 503,750.

This invention relates to circular saws for cutting wood, metal, or other materials. It is customary, in order to provide proper clearance, to make such saws with teeth which cut a kerf wider than the thickness of the saw body. Under such circumstances, it is found that the saw is apt to wabble slightly in a lateral direction or "chatter", particularly when the saw has teeth with a relatively large spacing so that during the rotation of the saw there may be a moment when no teeth are present in the kerf.

The present invention has for its principal object to provide an improved construction for circular saws which will avoid such wabbling and chattering. It is another object of the invention to provide a circular saw with suitable guide means which will substantially contact with the sides of the kerf in order to steady and guide the saw during cutting.

A further object of the invention is the provision of a circular saw construction in which the main body of the saw may be made thinner than usual without detriment to the smooth and steady cutting of the saw.

To these and other ends the invention resides in certain improvements and combinations of parts all as will be hereinafter more fully described the novel features being pointed out in the claims at the end of the specification.

In the drawings:

Fig. 1 is a side elevation of a fragment of a saw constructed in accordance with a preferred embodiment of the invention illustrating a piece of material being cut thereby;

Fig. 2 is a cross section taken substantially radially on the line 2—2 of Fig. 1, and Fig. 3 is a view similar to Fig. 1 illustrating a modified form of the invention.

Similar reference numerals throughout the several views indicate the same parts.

Referring now to Figs. 1 and 2 of the drawings, the saw comprises a body having a thin portion 10 which is preferably somewhat thickened at 11 adjacent the center of the saw in order to provide a more rigid connection with the arbor on which the saw is mounted. The saw has teeth 12 which may be either formed integrally with the body 10 or of the inserted tooth variety. The teeth 12 are so shaped and arranged that they will cut a kerf wider than the thickness 10 of the body of the saw, this being plainly illustrated in Fig. 2 which shows the kerf 13 being cut in a piece of material 14. Thus ample clearance is provided between the edges of the kerf and the sides of the saw blade 10.

The teeth are preferably also shaped, as well understood in the art, in a manner to provide the necessary clearance between the teeth and the kerf. For example, the teeth may have what is known in the art as front to back clearance, the front or cutting edge of each tooth being wider than the portion of the tooth behind the front edge, so that there is some clearance between the sides of the latter portion of the tooth and the sides of the kerf. This is well understood in the art.

In certain saws for high speed operation, it is desired to space the cutting teeth relatively far apart. The present invention is particularly applicable to saws of this kind, and saws having teeth spaced relatively far apart are illustrated in the drawings, although the invention is also useful, to some extent, in connection with saws having the teeth spaced closer to each other.

When the teeth are relatively far apart, as in Fig. 1, it may frequently happen that the piece of material being cut is of less thickness than the distance from one tooth to the next tooth. Hence during the rotation of the saw, one tooth will leave the kerf before the next tooth comes into contact with the material, as shown in Fig. 1, and in this way all of the teeth are momentarily out of the kerf.

Under these circumstances the saw is apt to wabble laterally or chatter during operation, because it is not constantly guided by contact with the sides of the kerf. The present invention provides guiding and steadying means preventing such lateral chattering or wabbling of the saw and results in extremely smooth cutting.

According to a preferred embodiment of the invention, the saw is provided with a pair of ridges 15 opposite each other on opposite sides of the saw body, which ridges are preferably arranged concentrically on the saw and at a point slightly inwardly from the teeth. These ridges extend laterally from the sides of the saw body 10 a sufficient distance so that they will substantially contact with the sides of the kerf cut by the teeth 12, as clearly illustrated in Fig. 2. The ridges or elevations 15 may be formed integrally with the body 10, or may be secured thereto in any suitable manner. In case the saw is of the inserted tooth variety, the ridges may be formed on the bodies of the inserts or on the main body of the saw blade to which the inserts are attached, as preferred. These ridges may be referred to as "stop ridges" since they come in contact with the sides of the kerf if the saw tends to wabble, and thus prevent substantial lateral vibration of the saw.

In a cutting operation, as soon as the kerf has been cut a sufficient depth so that the ridges 15 enter it, they remain substantially in contact with the sides of the kerf during the rest of the cutting operation so that they guide and steady the saw at all times and prevent lateral deflection or wabbling thereof even when all of the teeth may be momentarily out of the kerf, as illustrated in Fig. 1. Because of the guiding and steadying action of these ridges, the body 10 of the saw may be made somewhat thinner than usual, as it is not necessary to provide so much rigidity in the body of the blade when these guiding ridges are employed. The ridges also have an important and advantageous effect upon the tensioning of the saw.

As shown in Fig. 1, the ridges 15 are preferably continuous circular ridges. Fig. 3 illustrates a modification, however, in which the ridges are not continuous, but are composed of spaced arcs or segments 16 having spaces 17 between them. These spaces 17 are preferably arranged substantially opposite the teeth 12, as illustrated in Fig. 3. Hence whenever a tooth is in the kerf, the saw is guided and held against wabbling by the tooth, but when a tooth passes out of the kerf, the segments 16 enter the kerf and guide the saw until the next tooth enters the kerf. Thus the interrupted segments or arcs perform substantially the same function as the continuous ridge 15 previously described.

When a saw constructed in accordance with this invention is used to cut either wood or metal, the edges of the kerf cut thereby are found to be unusually smooth, resembling planed surfaces instead of the more or less ragged edges produced by ordinary circular saws.

While certain embodiments of the invention have been described, it is to be understood that the inventive idea may be carried out in a number of ways. This application is therefore not to be limited to the precise details described, but is intended to cover all variations and modifications thereof falling within the spirit of the invention or the scope of the appended claims.

I claim as my invention:

1. A circular saw comprising teeth spaced relatively far apart, a body inwardly of said teeth and thinner than the kerf cut thereby, and a ridge on said body projecting laterally from said body and having a substantially flat face adapted to run substantially in contact with a side of a kerf cut by said teeth to strengthen said saw and to guide and steady said saw whenever said teeth are momentarily out of said kerf.

2. A circular saw comprising a body, cutting teeth secured to said body and projecting laterally beyond the planes of opposite sides of said body to cut a kerf wider than the thickness of said body, and relatively narrow annular ridges on opposite sides of said body projecting laterally beyond said planes and having substantially flat faces adapted to run substantially in contact with opposite sides of said kerf to guide and steady said saw.

3. A circular saw comprising a body, cutting teeth secured to said body and projecting laterally beyond the planes of opposite sides of said body to cut a kerf wider than the thickness of said body, and relatively narrow annular non-cutting stop ridges opposite each other on opposite sides of said body and arranged concentrically with said teeth, said ridges projecting laterally beyond said planes substantially into contact with both sides of said kerf to guide and steady said saw.

WARREN B. HUTHER.